March 18, 1958     C. E. OSBORN     2,827,307
SELECTIVE IMPLEMENT HITCH
Filed April 10, 1956
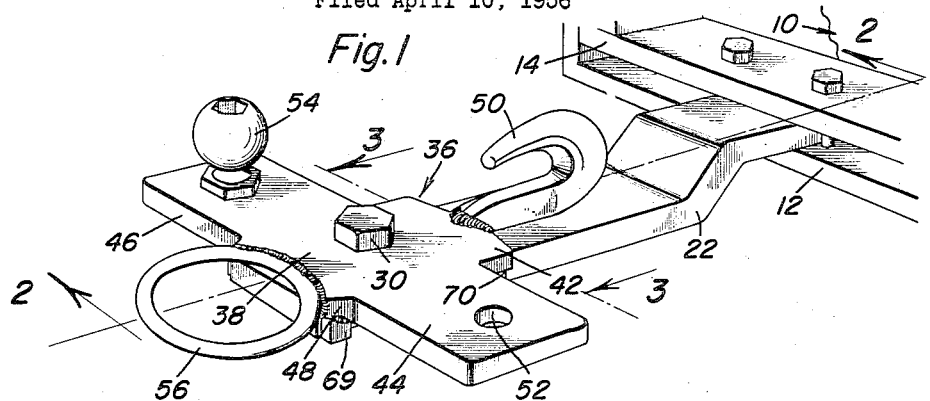
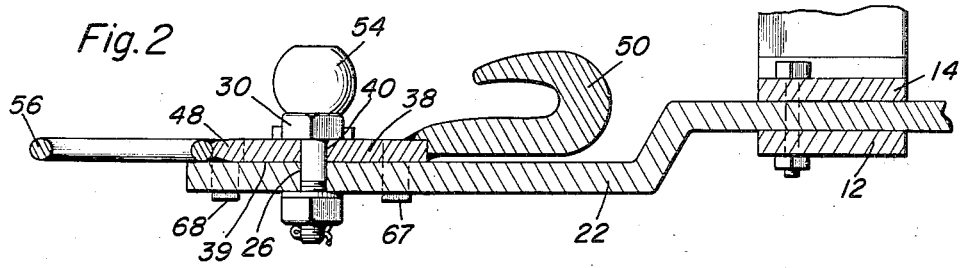
 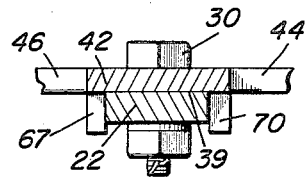
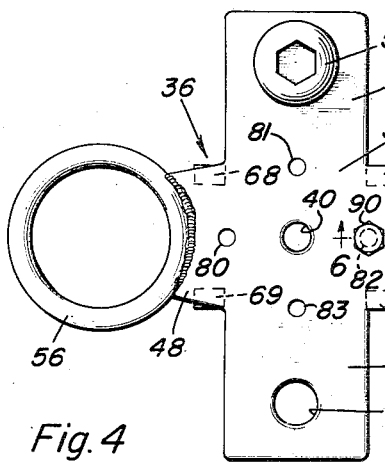 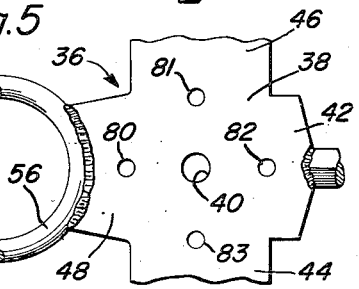
Clarence E. Osborn
INVENTOR.
BY *Clarence A. O'Brien*
*and Harvey B. Jacobson*
Attorneys United States Patent Office 2,827,307
Patented Mar. 18, 1958

2,827,307

SELECTIVE IMPLEMENT HITCH

Clarence E. Osborn, Shelbyville, Mo.

Application April 10, 1956, Serial No. 577,271

6 Claims. (Cl. 280—417)

This invention relates to the art of coupling a draft vehicle to a drawn vehicle and more particularly to a device which facilitates the coupling of various standard hitches to the drawbar or other part of a draft vehicle. The principal object of the invention is to provide a device that is mechanically simple and uncomplicated from a structural standpoint, the device making it possible to have a quick connect and disconnect arrangement between a draft vehicle, for example a farm tractor or automobile, and many of the standard and commercially available types of hitches on the drawn or towed vehicles. It is contemplated to use drawn vehicles such as farm machinery, wagons, trailers of all types and any other equipment that is customarily drawn without altering the hitches that the various manufacturers supply with them.

In connection with farm machinery it is particularly important that the device be maintained in a proper horizontal disposition so that the draft on the towed machinery will be true at all times during normal operation. Yet, it is important to the farmer that the device be very quickly interchanged from one position to another in order to attach the different hitch of another drawn vehicle to it. Accordingly, it is a further object of the present invention to provide a body having means for maintaining it in a horizontal position, this body when rotated to a new station in the horizontal plane, presenting means to attach to a different manufacturer's make or different type of hitch on the drawn vehicle.

A more specific object of the invention is to provide improvements in the means for holding the body at the selected station in the horizontal plane, these means being so arranged that they couple to the tractor drawbar quickly and easily.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a device that is made in accordance with the principles of the invention, the device being shown attached to a conventional drawbar which is attached to a tractor;

Figure 2 is a longitudinal sectional view taken on the line 2—2 of Figure 1;

Figure 3 is a transverse sectional view taken on the line 3—3 of Figure 1;

Figure 4 is a top plan view of a modification of the invention;

Figure 5 is a fragmentary plan view of another modification; and

Figure 6 is a fragmentary sectional view taken approximately on the line 6—6 of Figure 4.

This invention is a continuation-in-part of my co-pending application Serial No. 404,291 which was filed on January 15, 1954 and which is now abandoned.

In Figure 1 I have illustrated a fragmentary part of a standard tractor 10 typifying the draft vehicle with which the principles of the invention may be applied. The tractor 10 has drawbar plates 12 and 14 from which drawbar 22 protrudes. The outer extremity of the drawbar 22 has an aperture 26 through which pin 30 is passed. The pin may assume the form of a bolt as shown in Figure 2.

The device 36 of Figure 1 constitutes one form of the invention. It comprises a flat body 38. The lower surface 39 of the body 38 is planar or flat so as to be capable of sliding over the top surface of drawbar 22 and in the general horizontal plane. The center of body 38 has an aperture 40 in it through which pin 30 is adapted to pass. By having the pin pass through aperture 40 and aperture 26, the device 36 is mounted pivotally in a horizontal plane on drawbar 22. A plurality of arms are integrally formed with or are otherwise joined to the body 38 and they protrude from the body 38, being equally angularly spaced and coplanar therewith. There are arms 42, 44, 46 and 48 illustrating clearly that more than one arm is contemplated. The outer extremity of arm 42 is provided with an upwardly extending hook 50 which functions best with an implement hitch requiring an open-link or hook connection. The extremity of arm 44 has a hole 52 in which to accommodate a pin, clevis or the like when the same is required or suggested by the implement hitch that is to be attached to the device 36. Arm 44 may be used to replace the drawbar aperture and can be used as an extension on many tractor drawbars. The extremity of arm 46 has a ball 54 rising from the upper surface thereof in order to connect with the socket of the ball and socket type hitch customarily used with boat trailers, house trailers and other types of drawn vehicles. The outer extremity of arm 48 has loop 56 for use when the drawn vehicle has a hitch that includes an open-like or snap hook, rope or cable.

When mounting device 36 on drawbar 22, the planar lower surface 39 of body 38 is rested on the upper surface of the drawbar. Then the bolt is passed through aligned apertures 40 and 26 thereby mounting the body for pivotal movement in a horizontal plane and in such position that it is capable of being rotated to various positions in order to present a selected one of the arms 42, 44, 46 and 48 to the hitch of the drawn vehicle.

There are means for holding the device in the selected position of adjustment. They consist of four cleats 67, 68, 69 and 70, there being one cleat located in the angle formed by adjacent arms and welded or otherwise rigidly fixed thereto. The cleats protrude downwardly below the lower surface 39 of the device 36 in order to be brought against the sides of and straddle drawbar 22. When in a selected position, the pair of cleats that straddle a single arm, for example arm 42 of Figure 1 straddles drawbar 22 preventing the device from oscillating in the horizontal plane. To adjust the device, bolt 30 is loosened and body 36 is moved to a new position by first being lifted vertically and then rotating in a horizontal plane. The new pair of cleats then straddle drawbar 22, and the device vertically lowered after which bolt 30 is tightened. This simple maneuver is all that is necessary to accomplish what previously required a more lengthy and difficult procedure requiring a number of separate parts.

It is emphasized that the device is capable of being adjusted to several positions in a plane that is flush with the top surface of drawbar 22, in order to fit most standard tractor drawbars and be usable with them in an operative manner. The device provides the sole connection between the tractor drawbar and the drawn implement or other type of vehicle with which it is connected.

By a simple manipulation, for example loosening bolt 30, lifting and rotating the body of the device and then tightening the same bolt, the tractor becomes perfectly well suited and adapted to provide draft power to a drawn implement through a proper, as opposed to improvised connection between the drawbar and the drawn implement or other vehicle. What is required in the usual practice of today is a far more burdensome operation of altering the hitch or having a makeshift connection between the tractor and drawn vehicle.

The length of one or more of the arms 42, 44, 46 and 48 may be altered, although the compact unit illustrated is preferred. In addition the cleats 67, 68, 69 and 70 may be omitted and in their place, the arms provided with apertures 80, 81, 82 and 83 (Figure 5) through one of which a bolt 90 (Figures 4 and 6) is passed. Such bolt would be engaged in another aperture 91, in addition to aperture 26, in drawbar 22 to hold the device in the selected position of adjustment. Finally, the apertures 80, 81, 82 and 83 in the arms and the extra bolt 90 may be used with the cleats 67, 68, 69 and 70 (Figure 4). This would provide an option for the farmer to exercise. He could use either the cleats, or the apertures, or both.

Accordingly, the foregoing is considered as illustrative only of the principles of the invention. Since numerous other modifications and changes will readily occur to those skilled in the art, it is not desired to limit the invention to the exact construction and operation shown and described. All modifications and equivalents falling within the scope of the claims may be resorted to without departing from the coverage herein.

What is claimed as new is as follows:

1. A device for attaching various implement hitches to a horizontal apertured drawbar, said device comprising a body having a lower surface resting on the upper surface of the drawbar, a vertical pivot pin, said body being provided with an aperture in alignment with the aperture in the drawbar, said pivot pin being disposed in said aligned apertures thereby mounting said body on said drawbar for rotary movement in a horizontal plane and presenting selected parts of the body to the implement hitches, and releasable means to prevent said body from rotating on said drawbar, said means including a plurality of cleats which are arranged at approximately right angles to said body and which contact opposite sides of the drawbar requiring said body to be first vertically moved to free the cleats from the sides of the drawbar before said body may be rotated.

2. The device of claim 1 wherein said releasable means also includes a pin, and an opening in said body for the pin, the latter being also located in an aperture in said drawbar.

3. A device for selectively attaching implements to a drawbar, said hitch comprising a body having a central portion and plurality of arms extending therefrom, said arms being equally angularly spaced from one another, said central portion having means for rotationally mounting the body on a drawbar, cleats on each side of each of said arms for selectively securing the hitch in an adjusted rotational position of the drawbar by contacting opposite sides of the drawbar, and hitch connecting means on the free ends of said arms.

4. In a device to be used with a drawbar that has side edges and a horizontal flat top surface to couple it with a conventional hitch on a drawn vehicle, a body having arms protruding therefrom, said arms and said body having a flat surface that is located on the flat upper surface of the drawbar so that said body may be freely rotated thereon whereby a selected one of said arms is presented rearwardly to the conventional hitch, means operatively associated with said arms for coupling to the conventional hitch, said body having an aperture and the drawbar having an aperture aligned therewith, a pivot pin located in said aligned apertures to thereby mount said body on said drawbar for rotation, and means operatively associated with said device for locking said body in selected positions on said drawbar in order to hold the body in a position with a selected arm protruding rearwardly of the drawbar, said body locking means including at least one cleat that is secured on the device and which protrudes from the flat surface of the body and in contact with one of the side surfaces of said drawbar.

5. The combination of claim 4 wherein there is a second cleat spaced from the first cleat and arrange to contact the opposite side of the drawbar.

6. The combination of claim 5 wherein said arms are provided with apertures, and a bolt in a selected aperture that is passed therethrough and in an aperture in said drawbar in order to secure the body to the drawbar.

References Cited in the file of this patent

UNITED STATES PATENTS

| 1,422,129 | Reuse | July 11, 1922 |

FOREIGN PATENTS

| 463,395 | Germany | July 27, 1928 |